United States Patent
Naik

(10) Patent No.: US 7,480,809 B2
(45) Date of Patent: Jan. 20, 2009

(54) REDUCING POWER CONSUMPTION OF A MICROPROCESSOR

(75) Inventor: Parag Naik, Karnataka State (IN)

(73) Assignee: Genesis Microchip Inc., Santa Clara, CA (US)

( * ) Notice: Subject to any disclaimer, the term of this patent is extended or adjusted under 35 U.S.C. 154(b) by 516 days.

(21) Appl. No.: 11/251,586

(22) Filed: Oct. 13, 2005

(65) Prior Publication Data

US 2006/0101297 A1    May 11, 2006

Related U.S. Application Data

(60) Provisional application No. 60/619,060, filed on Oct. 15, 2004.

(51) Int. Cl.
*G06F 1/00* (2006.01)
(52) U.S. Cl. ................. 713/300; 713/320; 717/139
(58) Field of Classification Search ........... 713/300, 713/320; 717/139
See application file for complete search history.

(56) References Cited

U.S. PATENT DOCUMENTS

| | | | | |
|---|---|---|---|---|
| 5,790,874 A * | 8/1998 | Takano et al. | ........... | 713/320 |
| 6,463,521 B1 * | 10/2002 | Long | ........... | 712/213 |
| 7,287,149 B2 * | 10/2007 | Okamoto et al. | ........... | 712/208 |
| 2002/0120830 A1 * | 8/2002 | Matsuo | ........... | 712/209 |
| 2005/0010830 A1 * | 1/2005 | Webster | ........... | 713/320 |

* cited by examiner

*Primary Examiner*—Thomas Lee
*Assistant Examiner*—Vincent T Tran
(74) *Attorney, Agent, or Firm*—Beyer Law Group LLP

(57) ABSTRACT

Methods and apparatus, including computer program products, implementing and using techniques for reducing the power consumption of a microprocessor. One or more signal transitions in an instruction set of a microprocessor are profiled. A probability of occurrence is assigned to each instruction in the instruction set. A binary operation code is assigned to each instruction, based on the probability of occurrence for the instruction. The instructions having the highest probability of occurrence are assigned operation codes that require fewer signal transitions. As a result, the power consumption of the microprocessor is reduced.

10 Claims, 3 Drawing Sheets

| Opcode Instruction | Number of occurrences | Likelihood (%) |
|---|---|---|
| ADD | 1200 | 10.13 |
| ASL | 75 | 0.63 |
| BCC | 20 | 13.33 |
| CHK | 436 | 3.68 |
| CLR | 3333 | 28.14 |
| EOR | 496 | 4.19 |
| JMP | 378 | 3.19 |
| MOV | 5555 | 46.91 |
| NEG | 200 | 1.69 |
| SUB | 150 | 1.27 |
| TOTAL | 11843 | 100 |

REDUCING POWER CONSUMPTION OF A MICROPROCESSOR

CROSS-REFERENCE TO RELATED APPLICATIONS

The present application claims priority under 35 U.S.C. §119(e) from U.S. Provisional Patent Application No. 60/619,060 entitled "METHOD OF ASSIGNING OPCODES IN AN ISA OF A MICROPROCESSOR FOR REDUCING POWER CONSUMPTION" filed Oct. 15, 2004, the entire disclosure of which is incorporated herein by reference for all purposes.

BACKGROUND

This invention relates to reducing the power consumption of a microprocessor.

Microprocessors used in computers and other types of computing devices are typically power-sensitive components. That is, due to the large number of operations that a microprocessor performs, it is desirable to keep its power consumption per operation as low as possible, in order to reduce the energy usage of the device incorporating the microprocessor. In a computer, operation codes (opcodes) operate on registers, values in memory, values stored on the stack, the I/O ports, the bus, and so on. The opcodes are used to perform arithmetic operations and to move and change values. The opcodes operate on operands. Microprocessors convert the opcodes into sets of binary bits and perform operations using these sets of bits. Each bit in a set can have an on-state (typically represented as '1') or an off-state (typically represented as '0'). Eight bits are usually referred to as a byte on most conventional processors, and two bytes are usually referred to as a word.

The basic set of commands, or instructions, that a microprocessor understands is termed a command set, or an instruction set. Various types of microprocessors can have differently sized instruction sets, and this difference often constitutes one of the main differences between the microprocessors. For example, RISC (Reduced Instruction Set Computer) microprocessors have relatively small instruction sets, whereas CISC (Complex Instruction Set Computers) processors have relatively large instruction sets.

When designing an Instruction Set Architecture (ISA) for a microprocessor, little thought is typically given to how the respective instructions in the opcode that is used in the microprocessor are assigned to bit sets. The number of bits in an opcode instruction typically depends on the total number of instructions that can be carried out by the microprocessor, and which bits are assigned '0's and '1's, respectively, is usually arbitrarily determined. In most microprocessors, 6-8 bits correspond to an opcode instruction. There is always a one to one correspondence between a particular opcode instruction and a set of bits forming a corresponding machine code instruction.

One of the most common operations of a microprocessor is to fetch instructions from a memory external to the microprocessor for execution by the microprocessor. This is a power intensive operation, as the number of signal transitions is high. Thus, in order to reduce the power consumption of the microprocessor, it would be desirable to construct the ISA in such a way that the number of signal transitions in its most common operations is as low as possible.

SUMMARY

In general, in one aspect, the invention provides methods and apparatus, including computer program products, implementing and using techniques for reducing the power consumption of a microprocessor. One or more signal transitions in an instruction set of a microprocessor are profiled. A probability of occurrence is assigned to each instruction in the instruction set. A binary operation code is assigned to each instruction, based on the probability of occurrence for the instruction. The instructions having the highest probability of occurrence are assigned operation codes that require fewer signal transitions. As a result, the power consumption of the microprocessor is reduced.

Advantageous implementations can include one or more of the following features. The profiling step can include compiling a set of microprocessor instructions into an assembly file, and executing the assembly file through a pattern matching software tool which calculates the occurrences of the instructions. A histogram showing the signal transitions occurring during operation of the microprocessor can be generated. The instruction with the highest probability of occurring can be assigned a binary operation code consisting of only zeros.

In general, in another aspect, the invention provides a microprocessor. The microprocessor includes a set of registers, an arithmetic logic unit, and a control unit. The set of registers stores temporarily data during operation of the microprocessor. The arithmetic logic unit executes arithmetic and logical operations of the microprocessor. The control unit interprets instructions contained in a program that is executed by the microprocessor. The instructions form a subset of the microprocessor's instruction set architecture, and each instruction in the microprocessor's instruction set architecture has a binary operation code that is assigned to the instruction, based on the probability of occurrence for the instruction during operation of the microprocessor.

The invention can be implemented to include one or more of the following advantages. By assigning opcodes in the ISA of the microprocessor such that the most common opcodes have the lowest number of signal transitions, the power usage of the microprocessor can be significantly reduced at an architectural level.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Figure 1:
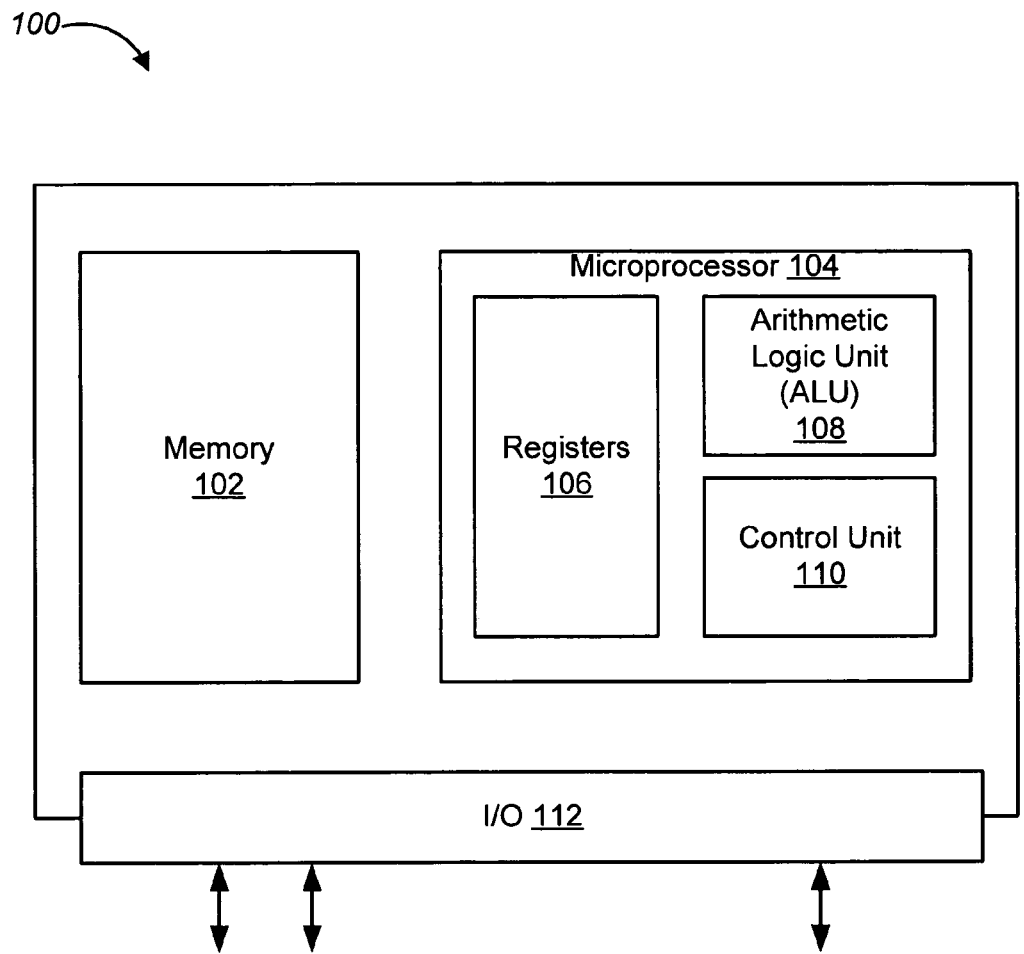
FIG. 1 shows a schematic diagram of a computer incorporating a microprocessor in accordance with the invention.

FIG. 1 shows a schematic block diagram of the functional units of a computer (100). As can be seen in FIG. 1, the computer (100) includes three main components: a microprocessor (104), a memory (102), and an input/output (I/O) system (112). The microprocessor (104) includes three main parts: the arithmetic logic unit (ALU) (108) where all arithmetic and logical operations take place, the registers (106) where data is temporarily stored, and the control unit (110), which interprets the instructions contained in the program that is being executed by the microprocessor (104). The memory (102) contains the program (i.e., a sequence of instructions) and the data to be processed by the microprocessor (104). The content in the memory (102) can be read as well as modified by the microprocessor (104). The I/O units (112) are used by the computer (100) to communicate with the outside world, as is well known by those of ordinary skill in the art.

As was described above, the microprocessor (104) performs operations using binary bits, and there is a one-to-one correspondence between a particular bit combination and a specific opcode instruction. That is, whenever a particular instruction is to be performed, the microprocessor (104) typically must change the states of one or more of the 6-8 bits to select the proper combination of zeroes and ones that form the opcode instruction. This switching of bits consumes power. Furthermore, in most conventional microprocessors, about 20% of the available instructions in the opcode set are performed about 80% of the time. Thus, by assigning specific bit combinations to the most common instructions, which require as few switches of bits as possible, the power consumption of the microprocessor (104) can be significantly reduced. A process (200) for reducing the power consumption of a microprocessor will now be described with reference to FIG. 2. In the implementation shown in FIG. 2, the process (200) is conducted at design time of the microprocessor.

Figure 2:
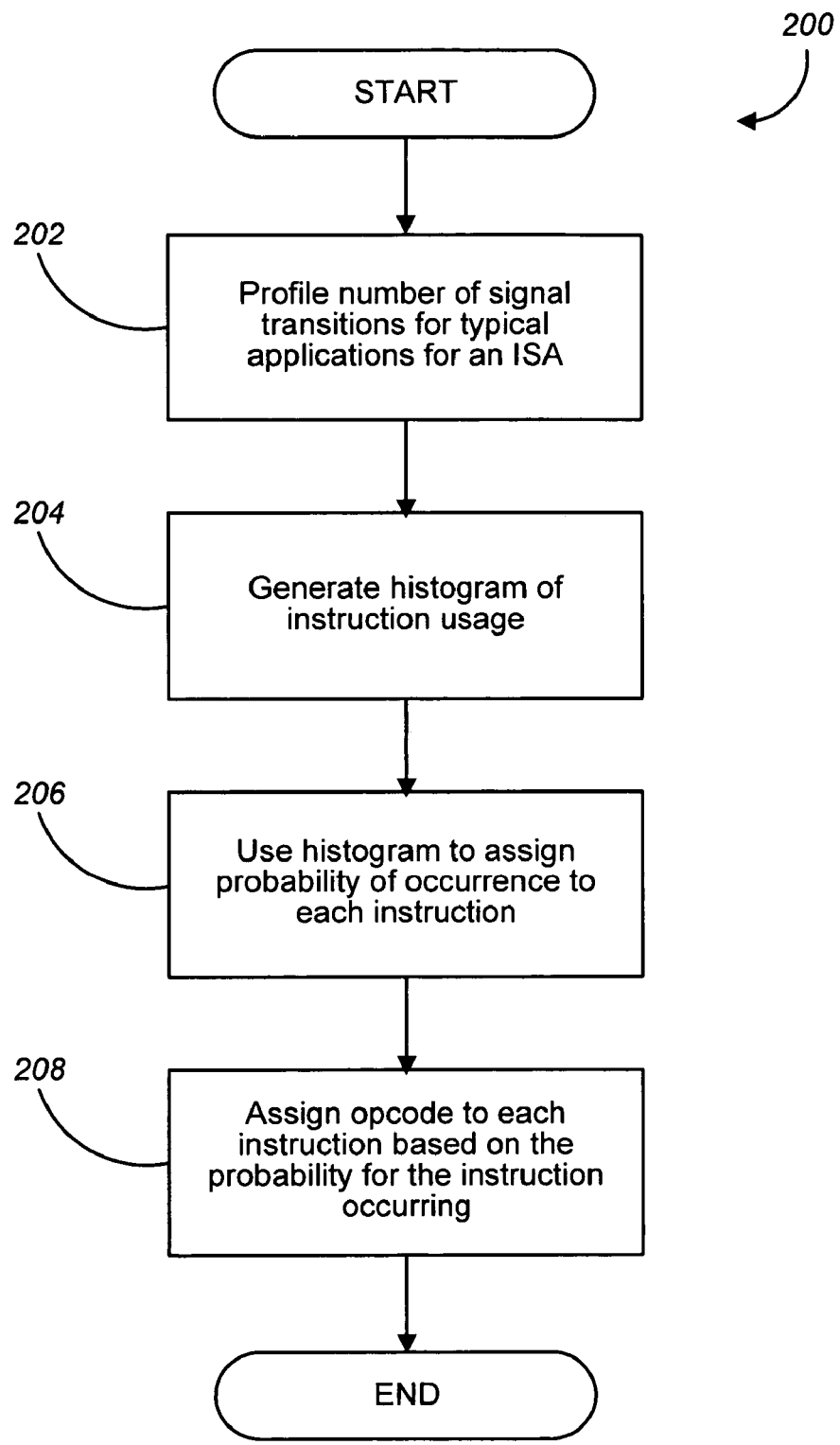
FIG. 2 shows a schematic diagram of a process for assigning opcodes to instructions in a microprocessor at design time.
Figures 3A, 3B:
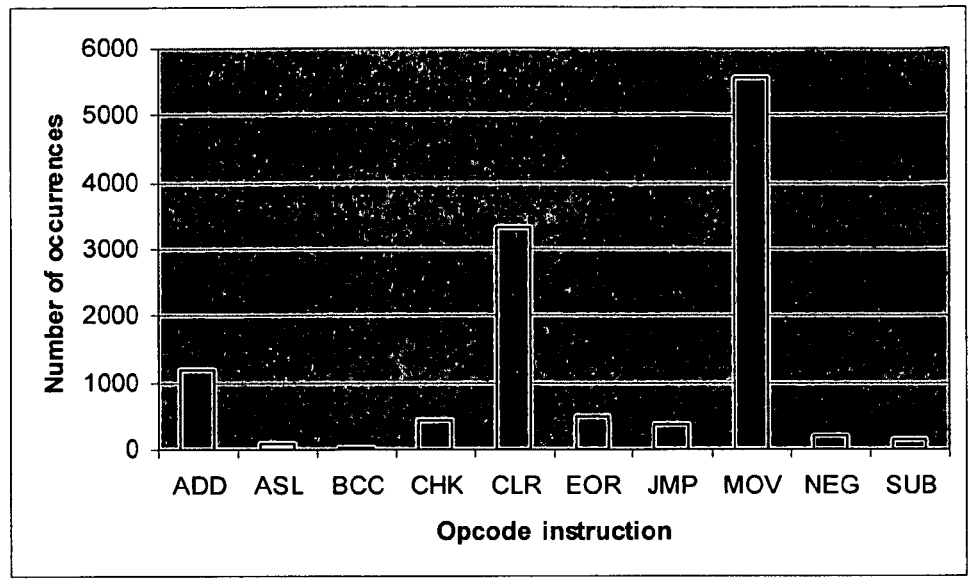
FIG. 3A shows an exemplary histogram illustrating the number of occurrences of various opcode instructions in a microprocessor.
FIG. 3B shows an exemplary table illustrating the likelihood of occurrences of various opcode instructions in a microprocessor, corresponding to the histogram in FIG. 3A.

As shown in FIG. 2, the process (200) starts by profiling the number of signal transitions for the various operations in an ISA (step 202). In an implementation for an existing microprocessor, the profiling can be done by taking a sample set of instructions that the microprocessor would execute when executing a program. This code is compiled into an assembly file, which is executed through a pattern matching software tool. If no compiler is available for the processor architecture, profiles are generated for other, similar, architectures. A histogram is then generated of the instruction usage of the microprocessor (step 204), for example, using the pattern matching software tool recited above, which calculates the occurrences of the instructions and plots the histogram. An exemplary histogram can be seen in FIG. 3A, where the number of occurrences for each opcode instruction in the microprocessor's instruction set has been plotted. It should be noted that the number of opcode instructions and the number of occurrences illustrated in FIG. 3A have been significantly reduced, in order to more clearly illustrate the principles of the invention. As can be seen in FIG. 3A, the most common opcode instructions are "BCC", "CLR", and "MOV."

Returning now to FIG. 2, based on the histogram, a probability of occurrence is assigned to each instruction (step 206). FIG. 3B shows a table corresponding to the histogram in FIG. 3A, and where the probability has been calculated in the right hand column. As can be seen in FIG. 3B, the probabilities for the three most common instructions are 46.91% for the "MOV" instruction, 28.14% for the "CLR" instruction, and 13.33% for the "BCC" instruction. Again, it should be noted that this is merely a hypothetical example illustrating the principles of the invention. In a situation where no compiler is available, the histogram is generated based on the selected similar processor architectures and a first guess for opcode assignments is made as described below. Subsequently this guess can be refined when a compiler becomes available on the new architecture.

Again returning to FIG. 2, in the last step of the process (200) an opcode is assigned to each instruction set, based on the probability for the instruction occurring (step 208), which completes the process. For example, if the profiling in step (202) shows that the 'MOV' instruction has the highest likelihood of occurring, then the assigning step (206) will assign bits '000000' or '111111' to the 'MOV' instruction, assuming that the opcode range is 6 bits, since neither of these assignments involve any signal transitions. The second most likely instruction can be encoded using the bit assignment that was not used by the most likely instruction, that is, '000000' or '111111,' respectively. The third most likely instruction can be encoded such that only a single signal transitions occurs, and so on.

As the person skilled in the art realizes, this architectural solution may allow the power consumption of the microprocessor to be significantly reduced and can be implemented at design time of the microprocessor. In another implementation, existing processors can be made compatible with the invention by adding extra circuitry that converts the existing bit assignments for the various instructions in the opcode set into bit assignments in accordance with the present invention.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

A number of implementations of the invention have been described. Nevertheless, it will be understood that various modifications may be made without departing from the spirit and scope of the invention. For example, a similar concept can be applied to data and not only to instructions. For example, if data represented by 16 bits, the frequency of use for all possible bit combinations (i.e., 2^16 combinations) can be studied in a similar fashion and be used to create various power-saving data retrieval schemes. Furthermore, the invention has been described by way of example with respect to a microprocessor and a memory, but it should be realized that the inventive concept can be extended to any two semiconductor devices that exchange a limited instruction set, for which a frequency of use can be determined. Accordingly, other embodiments are within the scope of the following claims.

The invention claimed is:

1. A computer-implemented method for reducing power consumption of a microprocessor, the method comprising:
    profiling one or more signal transitions associated with instructions in an instruction set of a microprocessor;
    assigning a probability of occurrence to each of one or more instructions in the instruction set; and
    assigning a binary operation code to at least one instruction of the one or more instructions in the instruction set based on the absolute probability of occurrence for the at least one instruction relative to the probabilities of occurrence of at least all of the other instructions of the one or more instructions, wherein instructions having the highest absolute probabilities of occurrence are assigned operation codes that require fewer signal transitions, whereby the power consumption of the microprocessor is reduced.

2. The method of claim 1, wherein the profiling step includes:
    compiling a set of microprocessor instructions into an assembly file; and
    executing the assembly file through a pattern matching software tool which calculates the occurrences of the instructions.

3. The method of claim 1, further comprising:
    generating a histogram showing the signal transitions occurring during operation of the microprocessor.

4. The method of claim 1, wherein the instruction with the highest probability of occurring is assigned a binary operation code consisting of only zeros.

5. A computer program product, stored on a machine-readable storage device, comprising instructions operable to cause a computer to:
    profile one or more signal transitions associated with instructions in an instruction set of a microprocessor;
    assign a probability of occurrence to one or more instructions in the instruction set; and
    assign a binary operation code to at least one each instruction of the one or more instructions in the instruction set based on the absolute probability of occurrence for the at least one instruction relative to the probabilities of occurrence of at least all of the other instructions of the one or more instructions, wherein instructions having the highest absolute probabilities of occurrence are assigned operation codes that require the fewer signal transitions, whereby the power consumption of the microprocessor is reduced.

6. The method of claim 5, wherein the instructions to profile further include instructions to:
    compile a set of microprocessor instructions into an assembly file; and
    execute the assembly file through a pattern matching software tool which calculates the occurrences of the instructions.

7. The method of claim 5, further comprising instructions to:
    generate a histogram showing the signal transitions occurring during operation of the microprocessor.

8. The method of claim 5, wherein the instruction with the highest probability of occurring is assigned a binary operation code consisting of only zeros.

9. A microprocessor, comprising:
    a set of registers operable to temporarily store data during operation of the microprocessor;
    an arithmetic logic unit operable to execute arithmetic and logical operations of the microprocessor; and
    a control unit operable to interpret instructions contained in a program that is executed by the microprocessor, the instructions forming a subset of the microprocessor's instruction set architecture, each instruction in the microprocessor's instruction set architecture having a binary operation code that is assigned to the instruction based on the absolute probability of occurrence for the instruction during operation of the microprocessor.

10. The microprocessor of claim 9, wherein the instructions having the highest probability of occurrence are assigned operation codes that require the lowest number of bit transitions.

* * * * *

UNITED STATES PATENT AND TRADEMARK OFFICE
CERTIFICATE OF CORRECTION

PATENT NO. : 7,480,809 B2 Page 1 of 1
APPLICATION NO. : 11/251586
DATED : January 20, 2009
INVENTOR(S) : P. Naik It is certified that error appears in the above-identified patent and that said Letters Patent is hereby corrected as shown below:

| COLUMN | LINE | ERROR |
|---|---|---|
| 6 | 17 | "at least one each" should read |
| (Claim 5, | line 8) | --at least one-- |

Signed and Sealed this

Fourth Day of May, 2010

David J. Kappos
*Director of the United States Patent and Trademark Office*